(12) United States Patent
Kao

(10) Patent No.: US 7,507,006 B2
(45) Date of Patent: Mar. 24, 2009

(54) FIXING STRUCTURE

(75) Inventor: Fu-Shun Kao, Miao Li County (TW)

(73) Assignee: Coretronic Corporation, Chu-nan (TW)

( * ) Notice: Subject to any disclaimer, the term of this patent is extended or adjusted under 35 U.S.C. 154(b) by 299 days.

(21) Appl. No.: 11/405,614

(22) Filed: Apr. 18, 2006

(65) Prior Publication Data
US 2006/0239015 A1    Oct. 26, 2006

(30) Foreign Application Priority Data
Apr. 22, 2005    (TW) ............................... 94206363 U

(51) Int. Cl.
*F21V 17/00*    (2006.01)
*G03B 21/14*    (2006.01)

(52) U.S. Cl. .................. 362/455; 362/293; 362/367; 353/20; 353/84

(58) Field of Classification Search ................. 362/456, 362/362, 367–368, 454–455, 293, 253; 359/892; 353/20, 84
See application file for complete search history.

(56) References Cited

U.S. PATENT DOCUMENTS
2005/0110962 A1*    5/2005    Watanabe et al. ........... 353/119

* cited by examiner

*Primary Examiner*—Sharon E Payne
*Assistant Examiner*—Sean P Gramling
(74) *Attorney, Agent, or Firm*—Birch, Stewart, Kolasch & Birch, LLP

(57) ABSTRACT

A lamp receptacle of a projection apparatus includes a receptacle body defining a receiving space, and having a peripheral wall and an upper opening. The peripheral wall is formed with an aperture. A fixing element is attached securely to the peripheral wall above the aperture, and protrudes into the receiving space. A filter glass is disposed in the receiving space behind the aperture in the peripheral wall. A holding frame is disposed behind the filter glass, and has a central hole aligned with the aperture. A mounting arm has a vertical section integrally formed with an upper section of the holding frame, and a horizontal section extending frontward from the vertical section to overlap and fasten the upper fixing element, thereby retaining the holding frame in such a manner to urge the filter glass to abut against the peripheral wall around the aperture.

12 Claims, 4 Drawing Sheets

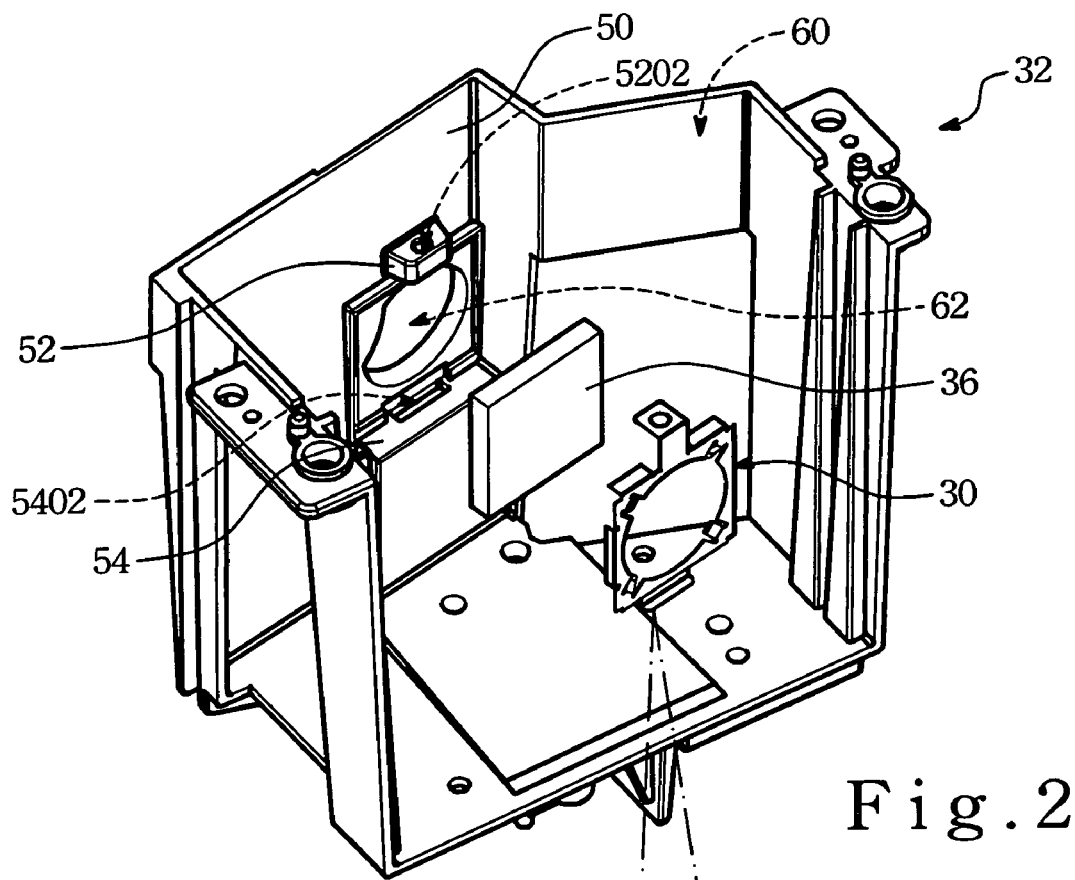
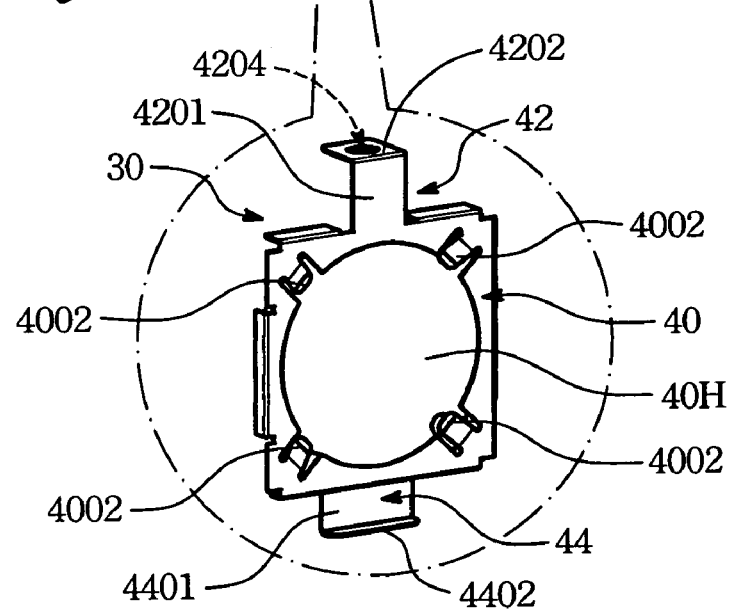
Fig.2A
Fig.2B

FIXING STRUCTURE

FIELD OF THE INVENTION

The invention relates to a projection apparatus, more particularly to a projection apparatus with a fixing structure for fixing a UV/IR filter glass in a lamp receptacle.

BACKGROUND OF THE INVENTION

FIG. 1 is a partly exploded view of a lamp receptacle 2 employed in a conventional projection apparatus for holding a lamp module (not shown) therein. The lamp receptacle 2 generally includes a receptacle body defining a receiving space, and having a peripheral wall 10 confining a front side of the receiving space and an upper opening 20 for access to the receiving space, a filter glass 6, and a fixing structure.

As shown, the peripheral wall 10 is formed with an aperture 22. The filter glass 6 is disposed in the receiving space behind the aperture 22. The lamp module (not shown) is disposed in the receiving space behind the filter glass 6 so that the light beams emitted therefrom extend outwardly from the receptacle body through the aperture 22 in the peripheral wall 10 via the filter glass 6. The fixing structure includes a holding frame 8 disposed behind the filter glass 6 and three screws 12. The holding frame 8 is formed with a central hole in alignment with the aperture 22 in the peripheral wall 10. The screws 12 extend through the holes 24a in the holding frame 8 to fasten into the threaded holes 24b in the peripheral wall 10, thereby confining the filter glass 6 between the peripheral wall 10 of the receptacle body and the holding frame 8.

Once the aforesaid lamp receptacle 2 is mounted in the conventional projection apparatus, a user can access the interior of the receptacle body only via the upper opening 20. In case of removing the holding frame 8 (due to breakage of the filter glass 6), the user must use a special tool or kit to remove the screws 12. Since the screws 12 extend in a direction transverse to the extendible direction of the assembler. The special tool is not always available. Alternately, a new one can replace the damaged lamp receptacle 2. Replacement of a new lamp receptacle may result in additional manufacturing cost and inconvenience to the assembler.

SUMMARY OF THE INVENTION

The main object of the present invention is to provide a projection apparatus including a fixing structure for fixing a UV/IR filter glass in a lamp receptacle so as to overcome the disadvantages encountered during using the conventional projection apparatus.

In one aspect of the present invention, a fixing structure is provided for fixing a UV/IR filter glass in a lamp receptacle. The lamp receptacle includes a receptacle body defining a receiving space, and having a peripheral wall and an upper opening for access to the receiving space. The peripheral wall confines a front side of the receiving space and is formed with an aperture. The receptacle body further includes an upper fixing element attached securely to the peripheral wall above the aperture and protruding into the receiving space. The upper fixing element is formed with a fastening hole. The UV/IR filter glass is disposed within the receptacle body behind the aperture in the peripheral wall. The fixing structure includes: a holding frame adapted to be disposed within the receiving space behind the filter glass, and having a central hole aligned with the aperture in the peripheral wall; an upper mounting arm having a vertical section formed with an upper section of the holding frame and a horizontal section extending frontward from the vertical section so as to overlap the upper fixing element, thereby retaining the holding frame in such a manner to urge the filter glass to abut against the peripheral wall around the aperture; and a fastener member extending through the horizontal section of the upper mounting arm to engage the fastening hole in the upper fixing element for preventing an untimely removal of the filter glass and the holding frame from the peripheral wall of the receptacle body.

In a second aspect of the present invention, a fixing structure is provided for fixing an optical component in a receptacle body. The receptacle body defines a receiving space, and has a peripheral wall and an upper opening for access to the receiving space. The peripheral wall confines a front side of the receiving space. The receptacle body further includes an upper fixing element attached securely to the peripheral wall and protruding into the receiving space. The optical component is disposed within the receptacle body behind the peripheral wall. The fixing structure includes: a holding frame adapted to be disposed in the receiving space behind the optical component; an upper mounting arm having a vertical section formed with an upper section of the holding frame and a horizontal section extending frontward from the vertical section to overlap the upper fixing element, the horizontal section being formed with a through hole; and a fastener member extending through the through hole in the horizontal section of the upper mounting arm to engage the upper fixing element for preventing an untimely removal of the optical component and the holding frame from the peripheral wall of the receptacle body.

BRIEF DESCRIPTION OF THE DRAWINGS

Other features and advantages of this invention will become more apparent in the following detailed description of the preferred embodiments of this invention, with reference to the accompanying drawings, in which:

FIG. 2A is a partly exploded view of a lamp receptacle employed in a projection apparatus of the present invention;

FIG. 2B is an enlarged perspective view a holding frame for use in the lamp receptacle shown in FIG. 2A;

DETAILED DESCCRIPTIONS OF THE PREFERRED EMBODIMENTS

Figure 1:
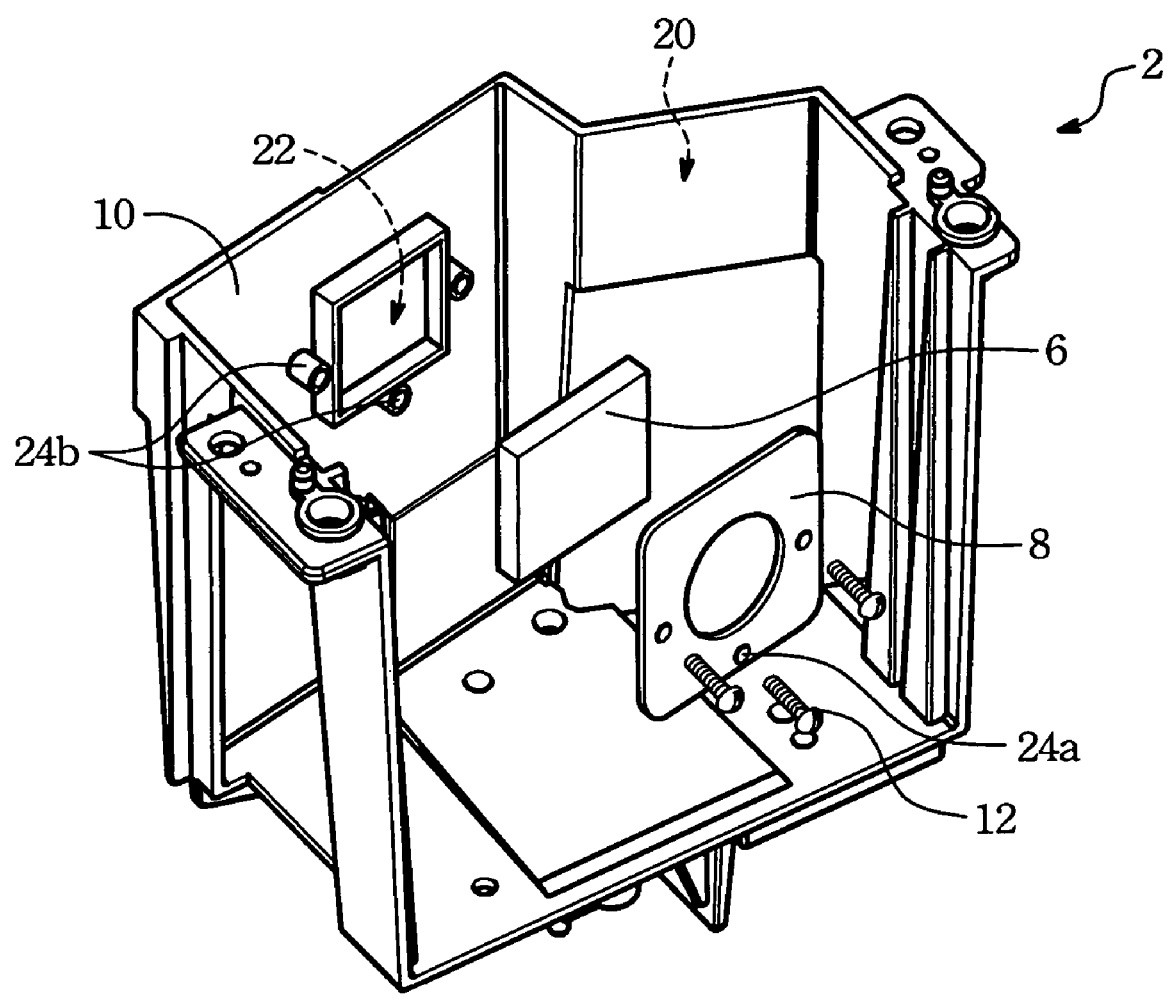
FIG. 1 is a partly exploded view of a lamp receptacle employed in a conventional projection apparatus.

Referring to FIG. 2A, a lamp receptacle includes a receptacle body 32, an optical component and a fixing structure 30. In the embodiment, the optical component is a UV/IR filter glass 36, for example.

As a matter of fact, the present projection apparatus generally includes an outer casing (not shown) for receiving the lamp receptacle therein and a projection lens (not shown) for projecting an image onto a distal screen. Since the feature of the present invention does not reside in the structure of the outer casing and the projection lens, a detailed description of the same is omitted herein for the sake of brevity.

The receptacle body 32 defines a receiving space, and has a peripheral wall 50 and an upper opening 60 for access to the receiving space. The peripheral wall 50 confines a front side of the receiving space, and is formed with an aperture 62. The receptacle body 32 further includes an upper fixing element 52 that is attached securely to the peripheral wall 50 above the aperture 62 and protrudes into the receiving space, and a lower fixing element 54 that is attached securely to the peripheral wall 50 below the aperture 62 and that projects into the receiving space. The lower fixing element 54 is formed with a fastening hole 5402. The upper fixing element 52 is formed with a fastening hole 5202.

The filter glass 36 is disposed in the receiving space in the receptacle body 32 behind the aperture 62 in the peripheral wall 50.

The fixing structure 30 includes a rectangular holding frame 40 and at least one fastener member (not shown). The holding frame 40 is disposed in the receiving space behind the filter glass 36, and has a central hole 40H aligned with the aperture 62 in the peripheral wall 50.

Referring to FIG. 2B, the fixing structure 30 further includes an L-shaped upper mounting arm 42 and an L-shaped lower mounting arm 44. The upper mounting arm 42 has a vertical section 4201 integrally formed with an upper section of the holding frame 40 and a horizontal section 4202 extending frontward from the vertical section 4201. The lower mounting arm 44 has a vertical section 4401 integrally formed with a lower section of the holding frame 40 and a horizontal section 4402 extending rearward from the vertical section 4401. In order to mount the filter glass 36 onto the peripheral wall 50, the vertical section 4401 of the lower mounting arm 44 is inserted firstly through the fastening hole 5402 in the lower fixing element 54, and the holding frame 40 is pressed forward in such a manner to urge the filter glass 36 to abut against the peripheral wall 50 around the aperture 62 and that the horizontal section 4202 of the upper mounting arm 42 overlaps the upper fixing element 52. Then, the fastener member is inserted through the horizontal section 4202 of the upper mounting arm 42 to engage the fastening hole 5202 in the upper fixing element 52 for preventing an untimely removal of the filter glass 36 and the holding frame 40 from the peripheral wall 50 of the receptacle body 32.

Note that after assembly, the horizontal section 4402 of the lower mounting arm 44 extends rearward from the vertical section 4401 so as to enhance confining of the filter glass 36 between the peripheral wall 50 and the holding frame 40. The holding frame 40, the upper mounting arm 42 and the lower mounting arm 44 can be formed from a single metal sheet by punching operation in order to cut down the manufacture cost. The fastener member can be a fastener screw. The horizontal section 4202 of the holding frame 40 is preferably formed with a threaded hole to permit extension of the fastener screw for engaging the fastening hole 5202 in the upper fixing element 52. The lamp module (not shown) can be disposed in the receiving space of the receptacle body 32 behind the holding frame 40 for generating light beams to pass through the central hole 40H in the holding frame 40, the filter glass 36 and the aperture 62 in the peripheral wall 50.

Referring again to FIG. 2B, the holding frame 40 further has a plurality of angularly spaced resilient tabs 4002 projecting frontward from a periphery defining the central hole 40H to abut against a peripheral portion of the filter glass 36, thereby providing a slight resiliency between the peripheral wall 50 and the filter glass 36.

Figure 3:
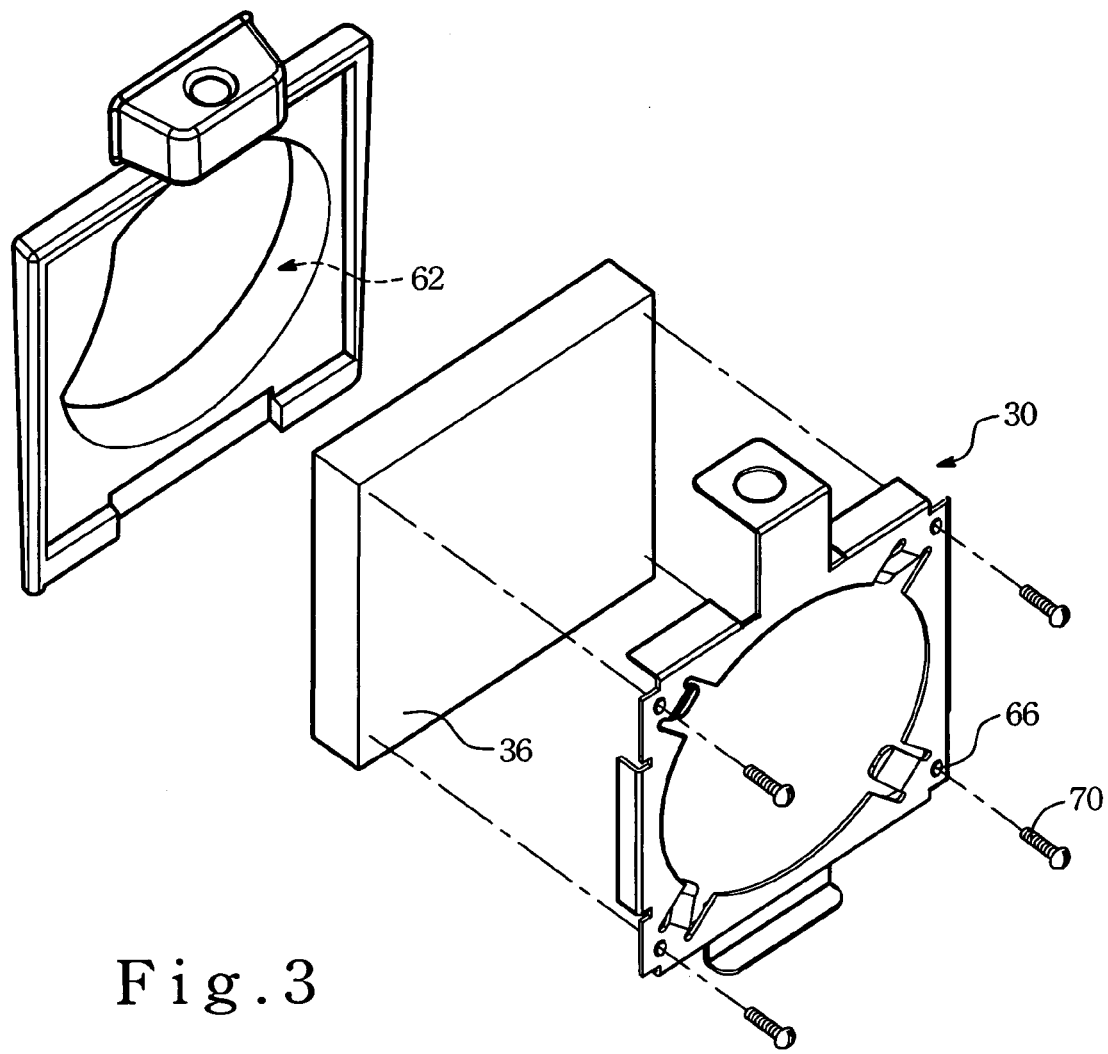
FIG. 3 is an exploded view showing a modified holding frame sandwiching a filter glass in cooperation with a peripheral wall of a second aspect of the present invention.

Referring to FIGS. 3 and 2A, the modified holding frame has a plurality of angularly spaced screw holes 66 respectively disposed outward respect to the resilient tabs 4002 (see FIG. 2B). The fixing structure 30 further includes four fastening screws 70 respectively extending through the screw holes 66 in the holding frame for fastening the peripheral wall, thereby confining the filter glass between the peripheral wall and the holding frame.

Figure 4:
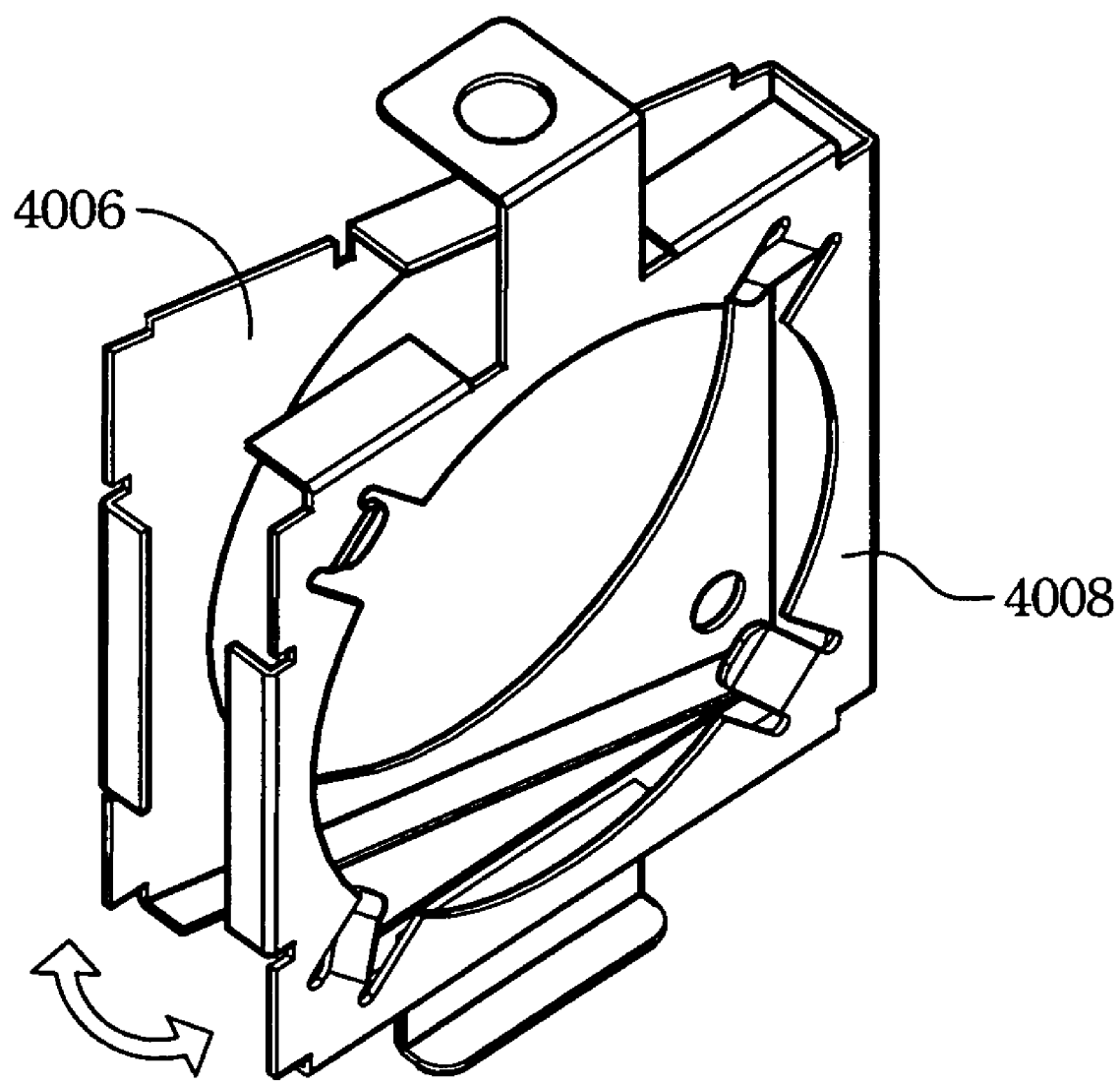
FIG. 4 is a perspective view of a front frame part and a rear frame part of a fixing structure of a third aspect of the present.

Referring to FIGS. 4 and 2A, the holding frame includes a front frame part 4006 that is disposed frontward of the filter glass (not shown in the drawing) behind the peripheral wall and that is formed with a front central hole, and a rear frame part 4008 that is disposed rearward of the filter glass, that is fastened detachably to the front frame part 4006 to sandwich the filter glass therebetween, and that is formed with a rear central hole in alignment with the front central hole. The front and rear central holes in the front and rear frame parts 4006, 4008 cooperatively define the central hole in the holding frame 40 (see FIG. 2B).

To summarize the above paragraphs, it is observable that since the assembler can directly access the receiving space in the receptacle body 32 via the upper opening 60, mounting and dismounting of the filter glass as well as the lamp module can be easily conducted. By utilizing the lamp receptacle in the projection apparatus of the present invention, the disadvantages encountered during use of the conventional projection apparatus are overcome.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A fixing structure for fixing a UV/IR filter glass in a lamp receptacle, the lamp receptacle including a receptacle body defining a receiving space, and having a peripheral wall and an upper opening for access to the receiving space, the peripheral wall confining a front side of the receiving space and being formed with an aperture, the receptacle body further including an upper fixing element and a lower fixing element, the upper fixing element being attached securely to the peripheral wall above the aperture and protruding into the receiving space, the upper fixing element being formed with a fastening hole, the lower fixing element being attached securely to the peripheral wall below the aperture and protruding into the receiving space, the lower fixing element being formed with a fastening hole, the UV/IR filter glass being disposed within the receptacle body behind the aperture in the peripheral wall, the fixing structure comprising:

a holding frame adapted to be disposed within the receiving space behind the filter glass, and having a central hole aligned with the aperture in the peripheral wall;

an upper mounting arm having a vertical section formed with an upper section of said holding frame and a horizontal section extending frontward from said vertical section so as to overlap the upper fixing element, thereby retaining said holding frame in such a manner to urge the filter glass to abut against the peripheral wall around the aperture;

a fastener member extending through said horizontal section of said upper mounting arm to engage the fastening hole in the upper fixing element for preventing an untimely removal of the filter glass and said holding frame from the peripheral wall of the receptacle body; and a lower mounting arm having a vertical section integrally formed with a lower section of said holding frame and extending through and engaging said fastening hole in said lower fixing element, and a horizontal section extending rearward from said vertical section of said lower mounting arm so as to enhance confining of the filter glass between the peripheral wall and said holding frame.

2. The fixing structure according to claim 1, wherein said fastener member is a fastener screw, said horizontal section of said holding frame being formed with a threaded hole to permit extension of said fastener screw for engaging the fastening hole in the upper fixing element.

3. The fixing structure according to claim 1, wherein said holding frame has a plurality of angularly spaced resilient tabs projecting frontward from a periphery confining said central hole to abut against a peripheral portion of the filter glass.

4. The fixing structure according to claim 1, wherein said holding frame further has a plurality of angularly spaced screw holes, the fixing structure further comprising a plurality of fastening screws respectively extending through said screw holes in said holding frame for fastening the peripheral wall, thereby confining the filter glass between the peripheral wall and said holding frame.

5. The fixing structure according to claim 1, wherein said holding frame includes a front frame part disposed frontward of the filter glass behind the peripheral wall, said front frame part being formed with a front central hole, said holding frame further including a rear frame part disposed rearward of the filter glass and fastened detachably to said front frame part to sandwich the filter glass between said front frame part and said rear frame part, said rear frame part being formed with a rear central hole in alignment with said front central hole, said front and rear central holes in said front and rear frame parts cooperatively defining said central hole in said holding frame.

6. A fixing structure for fixing an optical component in a receptacle body, the receptacle body defining a receiving space, and having a peripheral wall and an upper opening for access to the receiving space, the peripheral wall confining a front side of the receiving space, the receptacle body further including an upper fixing element and a lower fixing element, the upper fixing element being attached securely to the peripheral wall and protruding into the receiving space, the lower fixing element being attached securely to the peripheral wall and projecting into the receiving space, the lower fixing element being formed with a fastening hole, the optical component being disposed within the receptacle body behind the peripheral wall, the fixing structure comprising:

a holding frame adapted to be disposed in the receiving space behind the optical component;

an upper mounting arm having a vertical section formed with an upper section of said holding frame and a horizontal section extending frontward from said vertical section to overlap the upper fixing element, said horizontal section being formed with a through hole;

a fastener member extending through said through hole in said horizontal section of said upper mounting arm to engage the upper fixing element for preventing an untimely removal of said optical component and said holding frame from the peripheral wall of the receptacle body; and a lower mounting arm having a vertical section integrally formed with a lower section of said holding frame and extending through and engaging the fastening hole in the lower fixing element, and a horizontal section extending rearward from said vertical section of said lower mounting arm so as to enhance confining of the optical component between the peripheral wall and said holding frame.

7. The fixing structure according to claim 6, wherein said fastener member is a fastener screw, said through hole in said horizontal section of said upper mounting arm being a threaded hole to permit threaded extension of said fastener screw for engaging the upper fixing element.

8. The fixing structure according to claim 6, wherein said holding frame is formed with a central hole, and further has a plurality of angularly spaced resilient tabs projecting frontward from a periphery confining said central hole to abut against a peripheral portion of the optical component.

9. The fixing structure according to claim 6, wherein said holding frame further has a plurality of angularly spaced screw holes, the fixing structure further comprising a plurality of fastening screws respectively extending through said screw holes in said holding frame for fastening the peripheral wall, thereby confining the optical component between the peripheral wall and said holding frame.

10. The fixing structure according to claim 6, wherein said holding frame includes a front frame part disposed frontward of the optical component and formed with a front central hole, and a rear frame part disposed rearward of the optical component and fastened to said front frame part to sandwich the optical component between said front frame part and said rear frame part, said rear frame part being formed with a rear central hole, said front and rear central holes in said front and rear frame parts cooperatively defining a central hole of said holding frame.

11. The fixing structure according to claim 6, wherein the peripheral wall is formed with an aperture, the upper and lower fixing elements being attached to the peripheral wall at elevations above and below the aperture, the aperture in the peripheral wall being aligned with said central hole in said holding frame.

12. The fixing structure according to claim 6, where the optical component includes a UV/IR filter glass.

* * * * *